US012573308B2

(12) United States Patent
Guetta et al.

(10) Patent No.: US 12,573,308 B2
(45) Date of Patent: Mar. 10, 2026

(54) DRONE OPTICAL GUIDANCE SYSTEM

(71) Applicant: Shilat Optronics Ltd., Rehovot (IL)

(72) Inventors: Avishai Guetta, Rehovot (IL); Doron Shoham, Rehovot (IL); Yehezkel Shalom, Sha'alvim (IL); Michael Yagudaev, Beit Hashmonai (IL); Dekel Solomon, Holon (IL)

(73) Assignee: SHILAT OPTRONICS LTD., Rehovot (IL)

( * ) Notice: Subject to any disclaimer, the term of this patent is extended or adjusted under 35 U.S.C. 154(b) by 694 days.

(21) Appl. No.: 17/413,554

(22) PCT Filed: Dec. 17, 2019

(86) PCT No.: PCT/IL2019/051378
§ 371 (c)(1),
(2) Date: Jun. 13, 2021

(87) PCT Pub. No.: WO2020/129057
PCT Pub. Date: Jun. 25, 2020

(65) Prior Publication Data
US 2022/0013020 A1 Jan. 13, 2022

(30) Foreign Application Priority Data
Dec. 17, 2018 (IL) .......................................... 263768

(51) Int. Cl.
*G08G 5/55* (2025.01)
*B64D 47/04* (2006.01)
(Continued)

(52) U.S. Cl.
CPC ........... *G08G 5/0069* (2013.01); *B64D 47/04* (2013.01); *B64F 1/20* (2013.01); *G05D 1/12* (2013.01);
(Continued)

(58) Field of Classification Search
CPC ........... G05D 2105/35; G05D 2107/34; G05D 2109/20; G05D 1/226; G05D 2111/17; G05D 1/46; G05D 1/247
See application file for complete search history.

(56) References Cited

U.S. PATENT DOCUMENTS 3,742,495 A * 6/1973 Diamantides ......... G01S 5/0009
342/64
7,920,794 B1 4/2011 Whaley et al.
(Continued)

FOREIGN PATENT DOCUMENTS

FR 3028186 A1 * 5/2016 ............. A63H 27/12
FR 3053204 A1 * 12/2017 ............. B64U 10/14
(Continued)

OTHER PUBLICATIONS

PCT International Search Report and Written Opinion of the ISA, mailed Feb. 25, 2020 in PCT/IL2019/051378 (the IFW shows that the USPTO downloaded this document from WIPO and thus is already in possession of this document).
(Continued)

*Primary Examiner* — Bernarr E Gregory
(74) *Attorney, Agent, or Firm* — Daniel Feigelson

(57) ABSTRACT

A system for guiding a drone to an intended destination using a remote guidance system, independent of a global positioning system installed on the drone and independent of radio guidance. The system uses a two-way optical communication channel between the guidance system and the drone. The drone and the guidance system each have a light source emitting a beam of encoded light, such as a modulated laser beam, and having an extended field of illumination, and a detector receiving the impinging light beam. The guidance system can detect the angular location of the drone emission, and can transmit instructions optically to the drone, while the drone can receive flight path instructions
(Continued)

from the guidance system. The drone can be launched from a position that is not in the line of sight of its intended destination and guided optically from the launch position to its intended target destination.

18 Claims, 4 Drawing Sheets

(51) Int. Cl.

| | | |
|---|---|---|
| *B64F 1/20* | (2006.01) | |
| *G05D 1/00* | (2024.01) | |
| *G08G 5/00* | (2006.01) | |
| *G08G 5/57* | (2025.01) | |
| *B64U 10/14* | (2023.01) | |
| *B64U 101/31* | (2023.01) | |

(52) U.S. Cl.
CPC ............... *G08G 5/57* (2025.01); *B64U 10/14* (2023.01); *B64U 2101/31* (2023.01); *B64U 2201/20* (2023.01)

(56) References Cited

U.S. PATENT DOCUMENTS

| | | | | |
|---|---|---|---|---|
| 9,709,983 B2 * | 7/2017 | Seydoux | ................ | G08C 17/02 |
| 10,677,565 B2 * | 6/2020 | Avni | ....................... | F41G 7/263 |

| | | | |
|---|---|---|---|
| 2009/0114762 A1 | 5/2009 | Hurty | |
| 2012/0076397 A1 | 3/2012 | Moresve | |
| 2013/0206896 A1 | 8/2013 | Dicander | |
| 2017/0003680 A1 * | 1/2017 | Wang | ..................... A63H 27/02 |
| 2018/0105288 A1 | 4/2018 | Atkinson | |

FOREIGN PATENT DOCUMENTS

| | | |
|---|---|---|
| WO | 2011073980 | 6/2011 |
| WO | 2014136110 | 9/2014 |
| WO | 2016141100 A2 | 1/2018 |

OTHER PUBLICATIONS

Office Action in IL Patent Application No. 284003, dated Sep. 27, 2023, 5 pages.
Fidler F, Knapek M, Horwath J, Leeb WR. Optical communications for high-altitude platforms. IEEE Journal of selected topics in quantum electronics. May 17, 2010;16(5):1058-70. <https://publik.tuwien.ac.at/files/PubDat_189421.pdf>.
Office Action mailed Jan. 30, 2025 in Israel Patent Application 284003.

* cited by examiner

DRONE OPTICAL GUIDANCE SYSTEM

This application is a 35 USC 371 national phase entry of PCT International Application PCT/IL2019/051378, filed on Dec. 17, 2019, which claims benefit of priority under 35 USC 119 to Israel Patent Application 263768, filed on Dec. 17, 2018.

FIELD OF THE INVENTION

The present invention relates to the field of the guidance of unmanned aerial vehicles or drones to their intended target destination, especially by using optical communication of the ground station with the UAV/drone.

BACKGROUND

In recent years, drones have found widespread use. In some cases, a GPS guidance system may be used to guide the drone towards its intended destination; additionally or alternatively, the drone may be guided by means of radio contact with a controller on the ground. Drawbacks of using GPS guidance systems is the expense and the danger of interference. Radio communication, too, though low cost, can be intercepted and disturbed by third parties trying to interfere with the flight of the drone.

There therefore exists a need for a drone guidance system which overcomes at least some of the disadvantages of prior art systems and methods.

The disclosures of each of the publications mentioned in this section and in other sections of the specification, are hereby incorporated by reference, each in its entirety.

SUMMARY

The present disclosure describes new exemplary systems for guiding a drone or another unmanned aerial vehicle to an intended destination using a remote guidance system, independent of a global positioning system installed on the drone and without the use of radio guidance. Using the disclosed remote guidance system, the drone can be launched from a position that is not in the line of sight of its intended destination and guided optically from the launch position to its intended destination. The system uses a two-way optical communication channel between the guidance system and the drone. The drone and the guidance system each have a light source, for providing a beam having a wide field of illumination, by which each can detect or be detected by the other, and optionally for communicating with each other. Each of the light sources emits a beam of encoded light, such as a modulated laser beam, such as is described in International Patent Publication WO2011/073980 for "Laser Daylight Designation and Pointing" (LDDP), having a common applicant with the present application. The laser beams are diverged typically using a lens, such that they are emitted over a solid angle, such that they can be detected remotely anywhere within the divergent angular range of the beam. Thus, the drone does not need to know the exact location of the guidance system for the guidance system to be able to detect the optical signals emitted by the drone in the general direction of the guidance system. Similarly, the laser beam emitted by the guidance system, typically diverged using a lens, can be detected by the drone so long as the drone is within the conical beam of the guidance system, without the guidance system needing to know the exact position of the drone. The guidance system may emit a beam having an angle of the order of 90° or less, depending on the scenario circumstances, and the drone may emit a similarly divergent cone beam. Each of the drone and the guidance system also has a detector camera, such as a camera with a pixelated CCD array, for determining the angular location of an impinging encoded light beam, received from the other device. Use of the encoding and signal processing described in the LDDP system reduces any interference or flooding effect that background illumination may have on the optical signals traversing between the drone and the guidance system, such that each one can clearly distinguish the encoded beams from background illumination and from other beams, as described in detail in the above referenced published patent application WO2011/073980.

The guidance system thus comprises an optical emitter such as a pulsed CW laser, and an optical detector camera, with the camera normal aligned in approximately the same direction as the axis of the cone shaped laser beam transmission, such that the detection camera field of view is directed in the same general direction as the emitted beam. As explained above, the drone is fitted with its own pair of detector camera array and beam emitter, which are similarly approximately co-aligned in the general direction from where the guidance system beam is expected to be. This common alignment of emitter and detector cameras on both the guidance system and the drone provides for convenient detection by the drone of a beam from the guidance system, and convenient detection at the guidance system of a return beam from the drone to the guidance system. Having dual pairs of emitter and detector provides for bi-directional optical contact between the guidance system and the drone, and for mutual location of the emitter position in the field of view of the receiving detection system. In other words, the drone is able to determine the direction of the guidance system in its detector array, and the ground system is able to spatially locate the position of the drone in its detection camera display, by determining in which pixels of the camera array the optical signals are received. This allows for both the guidance system and the drone to align their respective optical transmitted beams towards the opposing detection system, such that an optical line of sight communication between the both drone and guidance system can be maintained. In general, the down transmission from the drone to the guidance system is used by the guidance system to determine the positon of the drone from the guidance system, while the up-transmission from guidance system to drone is generally used for sending flight path instructions and other operating instructions to the drone. In addition, the down-link may be used for transmission information, such as video recordings, from the drone to the ground station.

The guidance system has an orientation positioning system, on which either the complete guidance system is installed, or alternatively, on which the detection system is installed. The orientation positioning system can align the detection system towards the drone, so that it can receive the optical signals emitted by the drone. The orientation positioning system also has an AHRS (attitude and heading reference system), which is co-referenced to the axis of the detection system, so that the absolute azimuth and elevation of the normal axis of the detection system is accurately known. Since the position of the drone detected in the camera array is also accurately known from the pixel or pixels which detect the emitted beam of the drone, the absolute angular position of the drone is also accurately known relative to the guidance system.

The range of the drone from the guidance system can be determined by using a rangefinder module, which may utilize a retroreflector located on the drone. Alternatively, the rangefinder module can use the coded optical signals sent from the guidance system to the drone, and returned therefrom as a separate beam generated and transmitted without significant time delay, from the laser source of the drone. In a typical implementation, the emitter and detector of the drone are generally situated at the rear end of the drone, such that optical contact can readily be maintained between the guidance system and the drone as it flies away from the guidance system towards its target. The detection systems on both the drone and guidance system may be equipped with a filter, such that the detection systems are more sensitive to the wavelength of the encoded laser beam.

Using these beams of encoded light to communicate, the drone can be guided by the remote guidance system using the following steps. First, the guidance system should know the absolute position of the target in space, and similarly, the absolute position of itself, the guidance system.

Once the drone enters the field of view of the detector camera on the guidance system, the guidance system can guide the flight of the drone towards the target using the coded optical signals transmitted from the guidance system to the drone. The target may initially be located beyond or outside the field of view of either or both of the drone and the guidance system, as long as the guidance system is provided with the absolute azimuthal position of the target, and the guidance system receives optical signals from the drone supplying the guidance system with the range and angular position of the drone relative to the guidance system. This information enables a controller associated with the guidance system to calculate the absolute position in space of the drone. This calculation can be performed since the following information is known to the guidance system:
(i) the azimuthal bearing and angular elevation of the detection system axis,
(ii) the angular position and range of the drone relative to guidance system,
(iii) the absolute position in space of the guidance system
Since the guidance system thus knows the position in space of both the drone and the target, it can calculate a suitable flight trajectory for the drone to its target.

In one alternative embodiment, the guidance system can be adapted to use optical signals emitted by the drone in order to determine the angular position and range of the drone, but can use radio transmission in order to provide flight instructions to guide the drone. In such a system, the guidance system need not be equipped with an optical emitter, and additionally, the drone need not have an optical detector.

In another alternative embodiment, the drone receives optical control signals from the guidance system, in order to control the flight of the drone, but the system can use radio transmission, such as a radar system, in order to provide complete positioning information to the guidance system. In such a system, the drone need not be equipped with an optical emitter, and additionally, the guidance system need not have an optical detection system.

Either of the above two alternative embodiments may be used to simplify and lower the costs of the system. Use of either of these systems should be determined by the level of information security required by the specific situation.

There are a number of different scenarios possible by which the guidance system can know the position of the target:
(i) If the target is within the field of view of the guidance system camera, the position of the target can be imaged and therefore measured directly by the guidance system.

(ii) Even if the guidance system cannot see the target, its map position may be known and supplied to the guidance system.
(iii) The target may be observed from a forward position overlooking the target, which is closer to the target than the guidance system, and the forward observer can remotely mark the exact position of the target on the guidance system's map of the region, such that the guidance system controller now has the position of the target.

The launched drone may be configured to emit beams of encoded light, such that when the airborne drone enters the field of view of the detector on the guidance system, the guidance system may identify the position of the drone by detecting these optical signals. The guidance system may thus begin guiding the drone toward the target, using an optical communication link, such as that described in International Patent Application published as WO/IL2014/050223 for "Free Space Optical Communication System" having a common applicant with the present application.

In an alternative embodiment, the drone can be guided by the remote guidance system using the following steps. First, the guidance system should know the position of the target, namely its distance, bearing and height relative to the guidance system's own position.

Once the drone enters the field of view of the detector camera on the guidance system, the guidance system can guide the flight of the drone towards the target using the coded optical signals exchanged between the guidance system and the drone. The target may initially be located beyond or outside the field of view of either or both of the drone and the guidance system, as long as the guidance system is provided with the vector position of the target, and the guidance system has optical communication with the drone to provide the vector position of the drone relative to the guidance system. This information enables a controller, which can be on the guidance system or the drone, to perform a vector subtraction calculation, since it knows the range and angular orientation of the target from the guidance system, as well as the range and angular orientation of the drone from the guidance system, such that it can use this information to determine the range and orientation of the target from the drone and thus to calculate a suitable flight trajectory for the drone.

One advantage of using the above methods is that the guidance system and the drone communicate using encoded light signals that are difficult to intercept and modify, thus ensuring the accuracy and integrity of the guided flight. Another advantage is that the drone can be directed towards the target even if the target is not in the line of sight of either the drone or the guidance system, so long as the guidance system knows its own location relative to the target. Another advantage is that the drone can be a "dumb drone", such that it is not supplied with information regarding the location of the target prior to its launch. Thus, if the drone is intercepted by an enemy force, it will not reveal the location of the target.

The drone does not need to have a directional seeking system for homing on to the target, but can simply respond to instructions received from the guidance system, since the guidance system can calculate the necessary flight path of the drone to reach the target. However, another method of guiding the drone can be used if the drone is equipped with such a seeker, which can detect the target once it has entered the line of sight of the target, and provide guidance signals to its own flight controller to guide the drone to home in onto the target. One advantageous way of executing this seeking method is to apply a predefined optical designating mark on the target, such as from a forward observation post aiming a laser designator, or from the guidance system itself if it is in a position from where it can view the target and if it is equipped to designate the target optically. If the mission is to target a very limited object, such as a specific window of a building, or a specific vehicle, then the use of a designator to define the target is essentially mandated. On the other hand, if the mission is to reach a specific area, but not a specific item within that area, such as for surveillance, then a designation method is only required if the position of the target is not known a priori to the guidance system, or the guidance system cannot see the target area.

The intended destination of the drone may be, for example, an "attack position" from which it can launch an armed munition for attacking a target. Alternatively, the intended end destination of the drone itself may be the target itself, such that the drone is instructed to crash into the target and destroy it. Since the "target" and "attack position" are geographically linked, throughout this application the term "towards the target" is to be understood as either the "attack position" or the target itself.

Throughout this disclosure, although the term "drone" is used to describe the unmanned flying platform, it is to be understood that this term is to be understood as also covering all different types of unmanned aerial vehicles, whether resembling a conventional aircraft with wings, or a quadcopter, which the term "drone" is popularly used to describe, or any other type of UAV.

The guidance system is generally located on the ground, but it is to be understood that the guidance system can be mounted, for instance, on a vehicle which can move from position to position during the mission. In such a case, the position of the guidance system relative to the target should be constantly updated. There is therefore provided, in accordance with one exemplary system described in the present disclosure, a guidance system adapted to optically guide a drone towards a target, the guidance system comprising:

(i) an optical emitter, for sending encoded optical control signals towards the drone, (ii) a detection system, for receiving optical information relating to the angular position and range of the drone relative to the detection system axis, (iii) an orientation positioning system, adapted to determine the azimuthal bearing and angular elevation of the detection system axis.

The drone has the following elements:

(i) an optical emitter, for sending encoded optical information signals for detection by the guidance system, such that the angular position of the drone can be identified by the guidance system, (ii) a detector, for detecting the encoded optical control signals from the optical emitter of the guidance system, and (iii) a flight controller for controlling the drone's flight path, the flight controller adapted to receive the optical control signals from the detector on the drone, such that the drone is guided towards the target.

The detection system of the guidance system may comprise an imaging array, such that the angular position of the drone relative to the guidance system is determined by the detected position of the optical signal from the drone on the imaging array. In accordance with this implementation, the angular position of the drone may be determined by the azimuthal and elevation angles of the drone relative to the normal axis of the detection system.

According to any of the previously mentioned systems, the guidance system may be supplied with its absolute spatial position and orientation in space, such that the guidance system uses the azimuthal bearing and angular elevation of the detection system axis in combination with the determined angular position of the drone relative to the guidance system to determine the absolute location of the drone.

Furthermore, any of the previously mentioned systems may further involve the position of the target being designated by a designation system. The designation system may be located remotely from the guidance system.

Furthermore, the designation system may be laser based. In one example implementation where a designation system is used, the drone further comprises a seeker, adapted to home onto the designation on the target. In an alternative implementation, the position of the target is designated by supply of information to the guidance system. In this case, when the drone reaches the region comprising the target, the guidance system may supply the drone with instructions to aim at the target position.

In a system where a designation system is used to designate the target, the designation may comprise the marking of the position of the target on an image of the region comprising the target.

The drone may further comprise a retroreflector for providing range information to the guidance system, by reflecting a beam emitted by the guidance system. Additionally or alternatively, the optical emitter on the drone may be configured to return an optical signal in response to a received optical signal emitted by the guidance system, such that the guidance system can determine the range of the drone.

In some implementations, the optical control signals guide the drone towards the target, even when the drone is not in line of sight of the target.

The optical signals emitted by the guidance system should have a field of illumination sufficiently wide to cover the field of view in which the guidance system expects the detector of the drone to be situated.

Similarly, the optical signals emitted by the drone may be a field of illumination sufficiently wide to cover the field of view in which the drone expects the detection system of the guidance system to be situated.

The optical information signals emitted by the drone may comprise surveillance information, such that the optical information is securely transmitted to the guidance system.

In accordance with one exemplary system described in the present disclosure, a system for optical guidance of a drone to a target is disclosed, comprising:

a control system, comprising:

(a) a first emitter for sending optical signals to a drone, (b) a first detector for receiving optical signals from the drone, and (c) a flight controller for the drone wherein the drone comprises:

(a) a second emitter for sending optical signals to the control system, and (b) a second detector for receiving optical signals from the control system.

In an alternative embodiment, there is disclosed a guidance system adapted to optically guide a drone towards a target, the guidance system comprising:

(i) an optical emitter, for sending encoded optical control signals towards the drone, and (ii) a radar detection system, for receiving information relating to the angular position and range of the drone;

the drone comprising:

(i) a detector, for detecting the encoded optical control signals from the optical emitter of the guidance system; and (ii) a flight controller for controlling the drone's flight path, the flight controller adapted to receive the optical control signals from the detector on the drone, such that the drone is guided towards the target.

In such an implementation, the drone may further comprise an emitter, for sending encoded information signals for detection by the guidance system, such that the angular position of the drone can be identified by the guidance system.

In an alternative embodiment, there is disclosed a guidance system adapted to guide a drone towards a target, the guidance system comprising:

(i) an emitter, for sending control signals towards the drone;

(ii) a detection system, for receiving optical information relating to the angular position and range of the drone relative to the detection system axis; and (iii) an orientation positioning system, adapted to determine the azimuthal bearing and angular elevation of the detection system axis, the drone comprising:

(i) an optical emitter, for sending encoded optical information signals for detection by the guidance system, such that the angular position of the drone can be identified by the guidance system;

(ii) a receiver, for receiving the control signals from the emitter of the guidance system; and (iii) a flight controller for controlling the drone's flight path, the flight controller adapted to utilize the control signals from the receiver on the drone, such that the drone is guided towards the target.

In the above mentioned implementation, the emitter on the guidance system may be a radio emitter, such that the drone is guided using radio control signals.

BRIEF DESCRIPTION OF THE DRAWINGS

The present invention will be understood and appreciated more fully from the following detailed description, taken in conjunction with the drawings in which:

FIG. 1A shows the overall guidance system for directing a UAV, while FIG. 1B shows the alternative use of a drone;

DETAILED DESCRIPTION

Figure 1A:
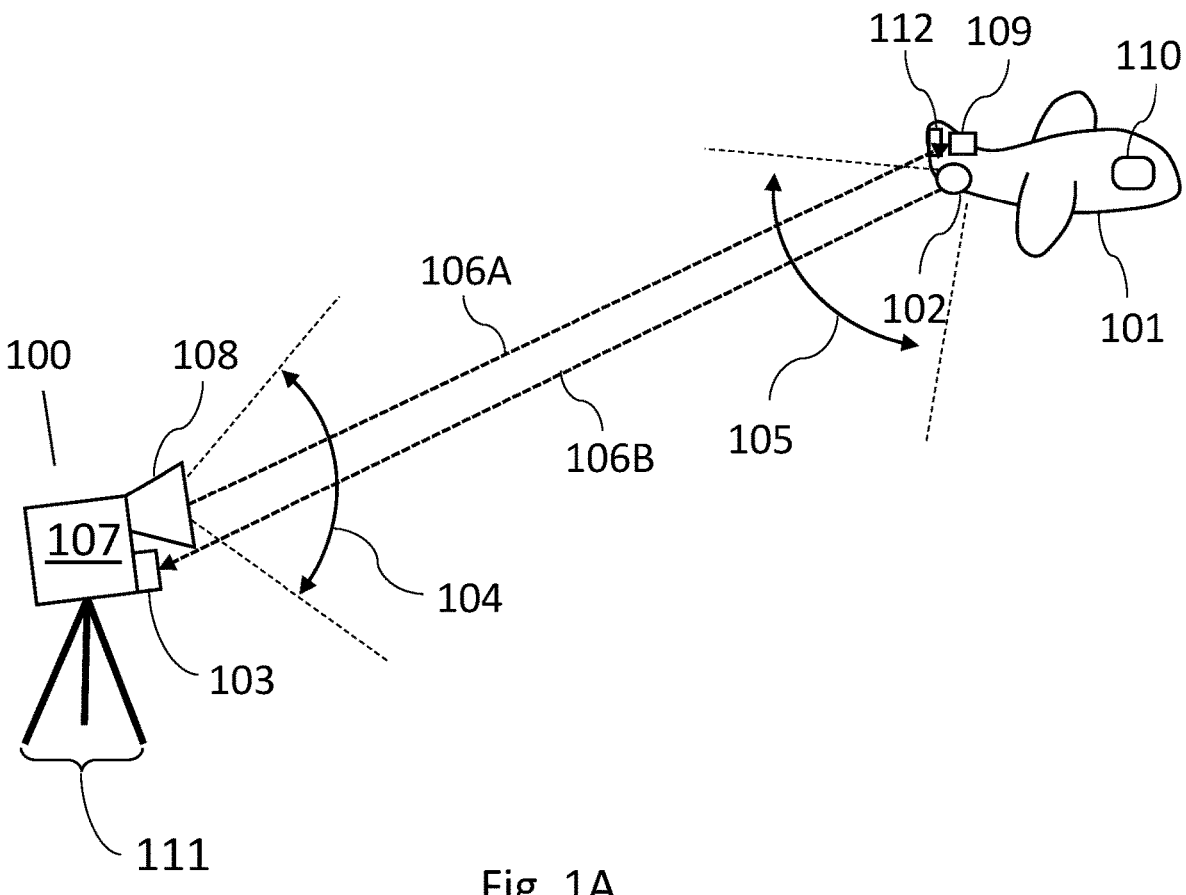
FIGS. 1A and 1B are schematic exemplary visualizations of the components of the presently disclosed drone guidance system.
Figure 1B:
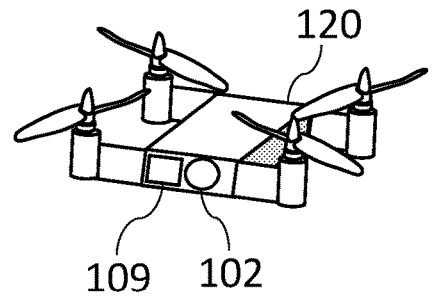

Reference is now made to FIG. 1A, which is a schematic exemplary visualization of the components of the presently disclosed system. The UAV or drone, 101 is guided using optical communication from a remote guidance system 100 having a control system 107, an emitter 108, a detector array 103, and an alignment system 111. In order to direct the UAV 101 towards a target (not shown in FIG. 1A), the guidance system may be supplied with its own absolute location, such as its map co-ordinates, as well as the location of the target, such as the target's map co-ordinates, so that the guidance system 100 knows the target location relative to its own location. In alternative implementations, as will be expounded hereinbelow, the position of the target relative to the guidance system must be known, even if the absolute position of either is not measured. The control system 107 instructs the optical beam emitter 108, to emit a beam having a wide field of illumination, as shown by angle 104, however, only a narrow part of the beam, 106A, may be detected by the drone detector array 109. The extent of the field of illumination of the beam may be adapted to the situation in which the system is operating, for instance, being narrower when the drone is launched from a location close to the guidance system, and larger when the system is used to utilize drones available from a "flock" which may have been launched from a distant location. The guidance system with its encoded optical beam 106A, may use the optical communication system as described in WO2011/073980, in which a laser designator system uses a modulated CW laser diode and a conventional high pixel count, image sensor array to filter a laser signal spatially, by collecting light over a comparatively long period of time from a very few pixels out of the entire field of view of the image sensor array. By spatially filtering the signal outputs of the individual pixels, it becomes possible to subtract the background illumination from the illuminated laser beam. The guidance system 100 has an aligning system 111, for aligning the direction of the guidance system towards the UAV, and should be equipped with an AHRS (attitude and heading reference system) to accurately define the azimuth and elevation readings of the guidance system 100. FIG. 1B shows an alternative configuration of the flying platform, in which the guided platform is a quadcopter drone 120, rather than a winged aircraft UAV. For the remainder of this application, the term drone is used, though it is understood that all references thereto are equally applicable to aircraft-type UAVs.

The guidance system 100 further comprises a detection camera system 103, aligned in the same direction as that of the laser emitter, for detecting an optically encoded beam 106B from the wide field of illumination 105, emitted by an optical emitter 102 installed on the drone 101. The detection camera is typically a pixelated array with optics enabling a field of view of several tens of degrees, such that the angular position of a source of illumination in a wide field of view can be imaged by the detection camera and displayed on the received image of the entire field of view. This arrangement of emitters and detectors on both guidance system and on the drone, enables the guidance system to determine the location of the drone, and to guide it accordingly. Having bi-directional communication allows for feedback of the drone position as it moves. Typically, both the optical emitter 108 and the detector camera 103 of the guidance system are generally oriented in the same direction, so that when the emitted beam 106A impinges on the detector array 109 of the drone, and the emitter 102 of the drone responds with a return optically encoded signal, that return signal can be detected in the field of view of the guidance system detector camera array. This may be performed by installing both the laser emitter and the detection camera system on the same positioning device 111.

The optical signals 106B generated by the emitter 102 on the drone 101 are beams of encoded light, and may use the same coding system as the optical emitter 108 of the guidance system, such as a pulse modulated CW laser beam. These optical signals are detected by the detector camera 103 of the guidance system, thus enabling the guidance system 100 to determine the angular position of the drone 101 in space. According to one exemplary system, the optical signals 106B emitted by the drone are configured to illuminate an area or field of view behind and generally below the drone, the field of view typically having a horizontal angle of 90 degrees, and a vertical angle of 90 degrees, generally from 20 degrees above the horizon to 70 degrees below the horizon, this level of division around the horizontal direction arising since the drone is usually at an altitude above the level of the ground where the guidance system is positioned, and thus should have a larger illumination and search sector below the horizontal direction. This wide field of illumination allows the guidance system to detect the optical signals without the drone having to direct its signals to the precise position of the detection system of the guidance system. Only a part of the beam, 106B, may be imaged by the guidance system camera array 103.

The range of the drone may be determined using a laser rangefinder. This may be accomplished by using the encoded optical transmission signals received at the drone 101 from the guidance system 100, and retransmitting a response signal back for detection at the guidance system. Any delay in generating and sending a returned transmission beam should be taken into account in calculating the range. However, this procedure may use part of the drone controller's computing resources. Therefore, according to an alternative implementation, the drone 101 may be equipped with a retroreflector 112, which reflects an optical encoded beam transmitted by the guidance system 100, and a laser rangefinder application in the guidance system can determine the range of the drone without the need to use the drone's optical transceiver capabilities. The guidance system 100 may send out pulses of encoded light 106A, as optical search signals, throughout the flight of the drone 101, at predefined regular intervals. The laser range finder has a rapid sampling rate, such that it takes measurements multiple times a second. In this manner, the range of the drone may be essentially continually measured to a high degree of precision.

According to another use of the laser rangefinder, if the guidance system 100 has not received optical signals from the emitter 102 of the drone 101 for a predetermined length of time, which implies that the guidance system has lost bi-directional optical communication with the drone, the guidance system detector camera can use the reflection in the drone retroreflector 112, of the transmitted encoded laser beam 106A from the emitter 108 of the guidance system, thereby enabling the guidance system to determine the location of the drone. The retroreflector 112 is typically located at the rear end of the drone 101, such that it can reflect back optical signals emitted by the remote guidance system 100. The guidance system should be positioned such that the detector 103 and emitter 108 are facing the drone's direction of flight.

The control of the flight trajectory of the drone to its target, using the guidance system, is performed using optically transmitted instructions, which may be optical signals 106A, with simple instructions as to how far up/down, left/right to fly, or may be a more complex flight path. The drone 101 may use its detector 109 for detecting these optical control signals to control the drone to fly as instructed by the remote guidance system 100.

Figure 2:
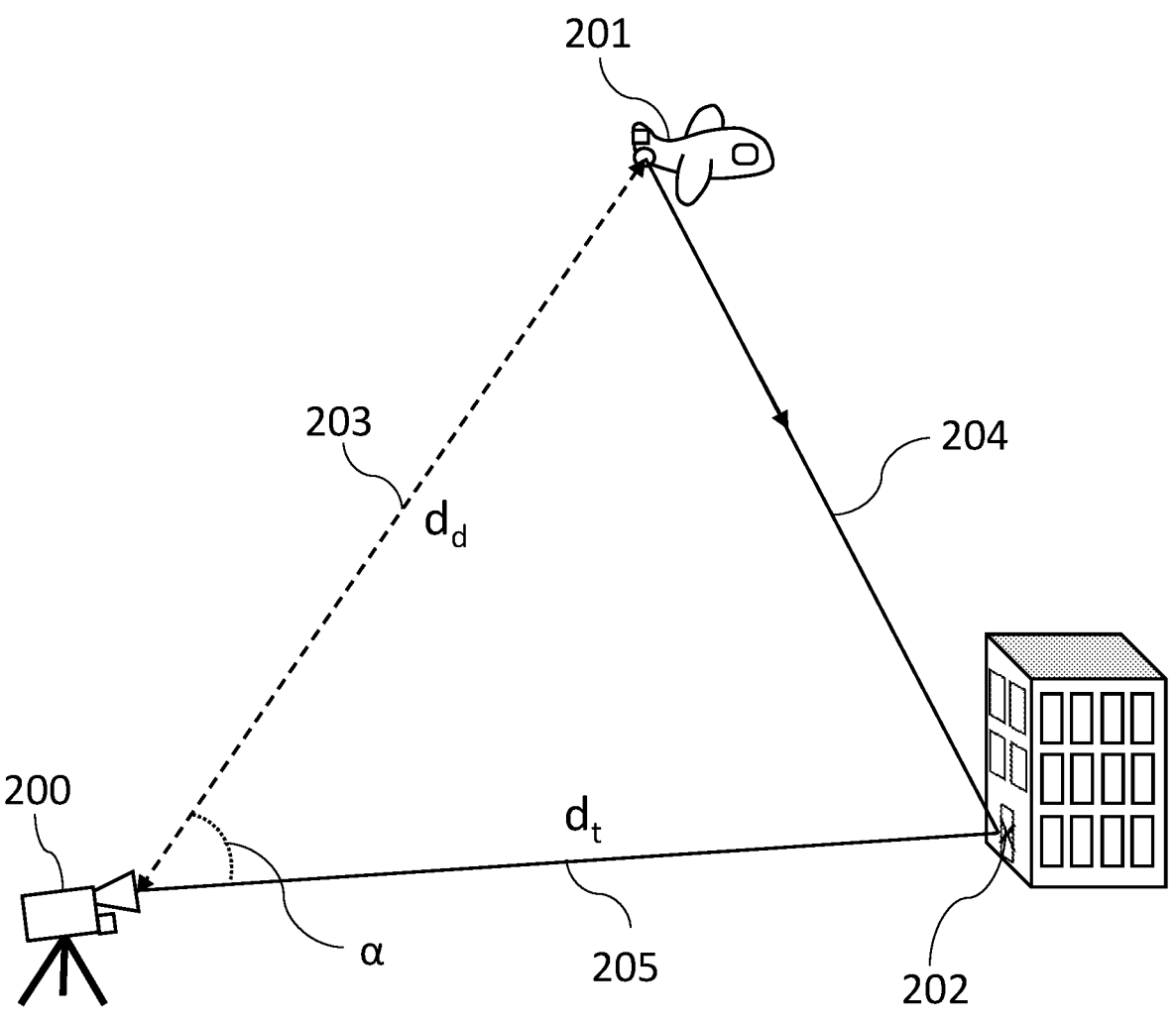
FIG. 2 is a schematic representation of a method whereby a guidance system and optical communication system, as described in FIG. 1 above, are used to guide a drone towards its target.

Reference is now made to FIG. 2, which is a schematic representation of how a guidance system 200 with its optical communication system, as described in FIG. 1 above, are used to guide a drone 201 towards its target 202. The guidance system 200 may determine the angular position of the target 202 by using its own optical detection system to image the region containing the target 202. The range $d_t$ of the target can be determined by a range measurement. A controller 107, which may be local or remote from the guidance system, may receive this image, and the operator or the controller itself, using image processing, may identify and mark an area or reference point in the image as the specific target, such that the absolute position in space of the target can be determined. The guidance system can also determine the angular position of the drone 201 marked as angle α. The range of the drone, shown as distance $d_d$, can be determined using either the bi-directional optical signals 203 exchanged between the guidance system and the drone, or using a beam transmitted by the guidance system and retroreflected back to the detector of the guidance system, or both for redundancy. Thus, the guidance system 200 can calculate the distance and angular direction, marked as flight path 204, which the drone 201 has to take to reach the target 202. The guidance system 200 can thus send the drone 201 optical control signals 203 defining the flight trajectory of the drone, so that the drone is guided towards its target.

Alternatively or additionally, the guidance system 200 may be provided with the target's location information from a source independent of the guidance system, such as pre-programmed information, or from a designation position in visual contact with the target.

When the drone reaches a location having a desired distance and position from the target, the guidance system may instruct the drone to aim at a specific position and direction, or to hover over a specific position, such as for surveillance tasks. In this case, the drone need not be equipped with a seeker, as all information regarding the target's position is supplied to the drone. Furthermore, in order to maintain constant optical contact with the guidance system, a drone is preferred to a UAV winged aircraft, since a drone can hover once it has arrived at its intended destination, without circling, such that the emitter on the drone can be constantly directed towards the guidance system.

Prior to its launch, the drone may be supplied or programmed with the general direction of the target, such that the remote guidance system may be used to simply correct the flight of the drone if the remote guidance system detects that the drone is deviating from its trajectory towards the target. Alternatively, the drone may not be supplied with this information, such that the remote guidance system controls a portion, or the entire duration, of the drone's flight, such that the drone receives no information regarding the region in which the target is located, prior to its launch.

Figure 3:
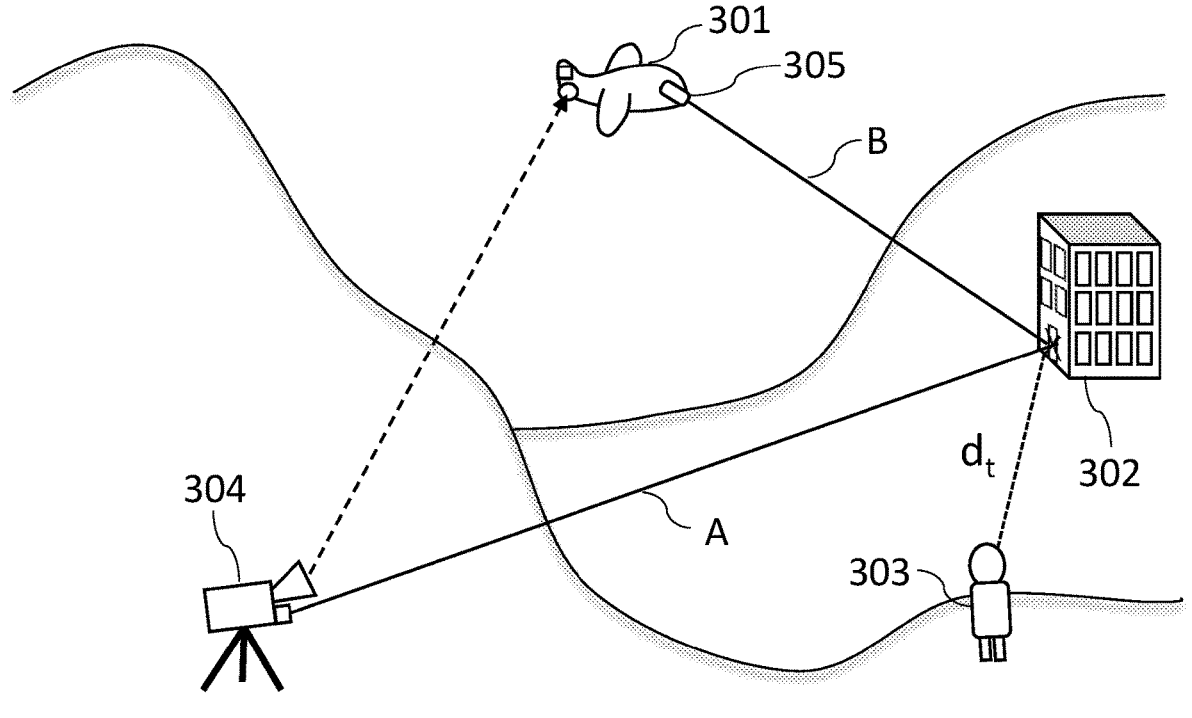
FIG. 3 shows an exemplary embodiment in which a laser designation system is used to designate the target.

Reference is now made to FIG. 3, which illustrates an exemplary embodiment in which a laser designation system 303 is used to designate the target 302. The designator may be installed on a personal weapon, or handheld, and could be positioned on a hill overlooking the target 302, such as a forward observation unit, as shown by a designator 303. Alternatively, the laser designator 303 may be installed on the guidance system 304, if the target region is within the line of sight of the guidance system. Optionally, an AHRS device may be installed on the designator, enabling accurate measurement of the direction of the laser designation. In order to enable the guidance system to determine the location of the target and hence the bearing in which to direct the drone, the designation system 303 may provide the guidance system with the approximate position and direction of the target, or any of the other methods described in relation to FIG. 2.

The guidance system 304 may use information received from the close designation team 303 to direct its detection system towards the designated target 302. The detector of the guidance system 304 can be adapted to identify the laser designated point 302, which is the target, in its detection system, as shown by line A. The guidance system may then use this identified designation as the location to which to guide the drone. The system accomplishes this by repeated imaging of both the laser designated target point, and by receiving updates about the drone's position from the images of the drones position on the guidance system's imaging array. By comparing the updated positions of both drone 301 and target 302, it is able to guide the drone to the target. The designation method described in FIG. 3, enables the drone to be guided towards a moving target.

As an alternative to the guidance of the drone by means of instructions received from the guidance system, the drone may be equipped with a seeker 305, such that when the drone 301 is in the line of sight of the designated target 302, such that the seeker 305 on the drone can identify the designated target, the drone may itself seek out the designated target 302, as shown by line B. The guidance system may optionally instruct the drone in which direction to seek out the target. Even when the drone uses its own seeker to identify the target, the guidance system may still be used to control the drone using the optical communication system. For example, the guidance system may instruct the drone to aim at the target, or it may instruct the arming of munitions on the drone, or it may instruct the drone to hover or circulate in a standby position awaiting further instructions, or any similar scenario.

In any embodiment, the guidance system may be configured to be able to instruct the drone to perform, at any point in its flight, other functions, such as to return to its launch base, to abort its flight, to self-destruct, to prime weapons, to release a payload, or any such commands.

Figure 4:
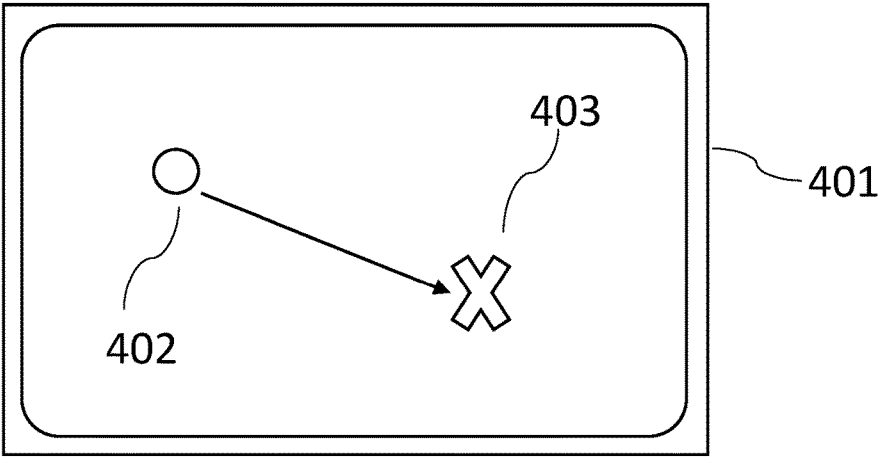
FIG. 4 shows a view of the monitor screen of the guidance system, with the actual location of the drone shown relative to its desired position, which is the target.

Reference is now made to FIG. 4, showing a monitor 401 of the guidance system, wherein the actual location 402 of the drone is shown relative to its destination position 403, which is the target. From the information generating such a display, the exact azimuthal angle and angular elevation of the drone may be determined, since the azimuthal and angular elevation of the detection camera axis is known from the AHRS system attached to the guidance system.

Figure 5:
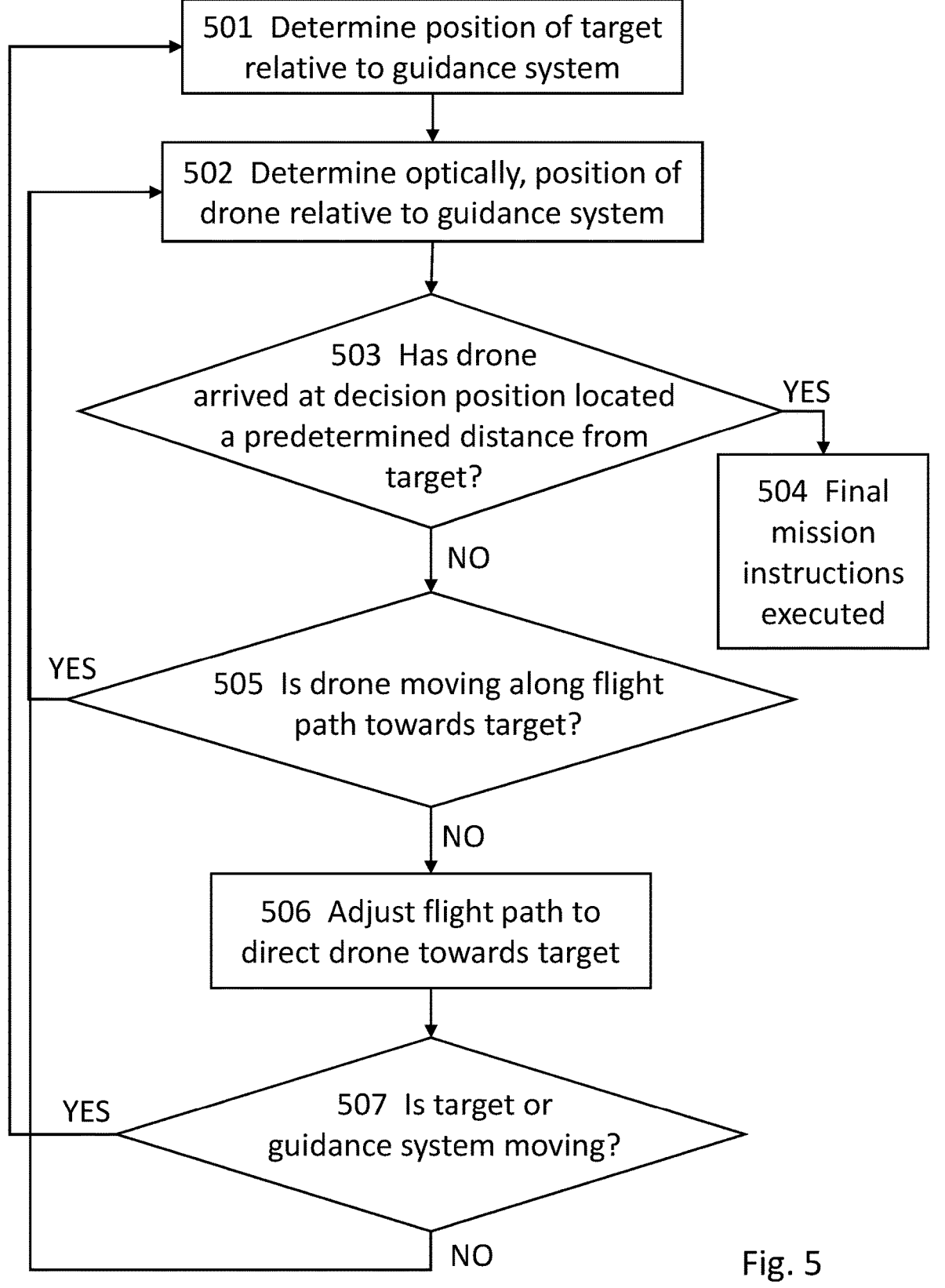
FIG. 5 is an exemplary flow chart delineating the steps involved in operation of the system, and guiding the drone to its target.

Reference is now made to FIG. 5, which is an exemplary flow chart delineating the steps involved in operation of the system, and guiding the drone to its target, as described by the methods of FIGS. 1 to 3. The exemplary method depicted in FIG. 5 relates to a scenario in which the drone is guided to a staging position close to the target, where an operative decision has to be given to the drone including such actions as arming the warhead, attacking the target, performing surveillance over the target area, aborting the mission, returning to the launching area, and the like. This is not intended to be the only method by which the drone may be directed, and flow charts for other types of operation of the mission would involve appropriate changes to the method.

In step 501, the position of the target relative to the guidance system is determined, including bearing and distance information, either by determining both the absolute position in space of the target and the guidance system, or by any of the other methods as described above.

In step 502, the guidance system determines the position of the drone by detecting optical signals received from the drone, such that its angular and elevation bearing are known, and measuring the distance of the drone from the guidance system using a rangefinder application.

In step 503, the control system determines whether the drone has arrived at a mission decision position a predetermined distance from the target;

If the drone has reached such a position, then in step 504, it awaits instructions from the mission control system regarding attack on the target or refraining therefrom, or any other action instructed by the ground control. During any such waiting period, if at all relevant, the drone can hover, or, if an aircraft-type platform, the UAV can circle, until the instruction about how to proceed with the mission is received from mission control. If no such wait is necessary before completing the mission, step 504 becomes simply the completion of the mission at the target.

On the other hand, if the drone has not reached such a position, then in step 505, the control system redetermines the position of the drone using optical communication with the drone, thus verifying whether the drone is continuing along the flight path which will direct the drone towards the target. If the drone is on its correct flight path, then the control system waits a predetermined time before returning to step 501 and redetermining the position of the drone.

If, on the other hand, the drone is not on the correct flight path, then in step 506, the control system sends optical instruction signals to adjust the actual flight path of the drone, such that it is redirected towards the target.

In step 507, if the target is a moving target whose position is being actively determined by a laser designator, or if the guidance system is vehicularly mounted, and may have moved from its previous position, the procedure returns, after a predetermined time delay dependent on the iteration time required of the system, to step 501, and the present relative positions of the guidance system and of the target are redetermined.

On the other hand, if neither the target nor the guidance system are known to have moved, the procedure returns to step 502, where the position of the drone is redetermined.

The iterative steps 501 to 507 are repeated until the drone arrives at its predetermined decision position, as in step 504.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

We claim:

1. A guidance system adapted to optically guide a drone towards a target, the guidance system comprising:

an optical emitter, for sending encoded optical control signals towards the drone;

a detection system, for receiving optical information relating to the angular position and range of the drone relative to the detection system axis; and an orientation positioning system, adapted to determine the azimuthal bearing and angular elevation of the detection system axis, the drone comprising:

an optical emitter, for sending encoded optical information signals for detection by the guidance system, such that the angular position of the drone can be identified by the guidance system;

a detector, for detecting the encoded optical control signals from the optical emitter of the guidance system; and a flight controller for controlling the drone's flight path, the flight controller adapted to receive the optical control signals from the detector on the drone, such that the drone is guided towards the target.

2. A system according to claim 1 wherein the detection system of the guidance system comprises an imaging array, such that the angular position of the drone relative to the guidance system is determined by the detected position of the optical signal from the drone on the imaging array.

3. A system according to claim 2, wherein the angular position of the drone is determined by the azimuthal and elevation angles of the drone relative to the normal axis of the detection system.

4. A system according to claim 3 wherein said guidance system is supplied with its absolute spatial position and orientation in space, such that the guidance system uses the azimuthal bearing and angular elevation of the detection system axis in combination with the determined angular position of the drone relative to the guidance system to determine the absolute location of the drone.

5. A system according to claim 2 wherein said guidance system is supplied with its own absolute spatial position and orientation in space, such that the guidance system uses the azimuthal bearing and angular elevation of the detection system axis in combination with the determined angular position of the drone relative to the guidance system to determine the absolute location of the drone.

6. A system according to claim 1, wherein the position of the target is designated by a designation system.

7. A system according to claim 6, wherein the designation system is laser based.

8. A system according to claim 6, wherein the drone further comprises a seeker, adapted to home onto the designation on the target.

9. A system according to claim 6, wherein the position of the target is designated by supply of information to the guidance system.

10. A system according to claim 9, wherein when the drone reaches the region comprising the target, the guidance system supplies the drone with instructions to aim at the target position.

11. A system according to claim 6, wherein the designation comprises the marking of the position of the target on an image of the region comprising the target.

12. A system according to claim 6, wherein the designation system is located remotely from the guidance system.

13. A system according to claim 1, wherein the drone further comprises a retroreflector for providing range information to the guidance system, by reflecting a beam emitted by the guidance system.

14. A guidance system according to claim 1, wherein the optical control signals guide the drone towards the target, even when the drone is not in the line of sight of the target.

15. A system according to claim 1 wherein the optical emitter on the drone is further configured to return an optical signal in response to a received optical signal emitted by the guidance system such that the guidance system can determine the range of the drone.

16. A system according to claim 1 wherein the optical signals emitted by the guidance system have a field of illumination sufficiently wide to cover the field of view in which the guidance system expects the detector of the drone to be situated.

17. A system according to claim 1 wherein the optical signals emitted by the drone have a field of illumination sufficiently wide to cover the field of view in which the drone expects the detection system of the guidance system to be situated.

18. A system according to claim 1 wherein said optical information signals emitted by said drone further comprise surveillance information, such that the optical information is securely transmitted to the guidance system.

* * * * *